Feb. 3, 1970  W. H. BOWERS  3,493,063
GAS WEIGHING APPARATUS

Filed May 14, 1968  3 Sheets-Sheet 1

INVENTOR
WILLIAM H. BOWERS
BY
Seidel & Gonda
ATTORNEYS

Feb. 3, 1970   W. H. BOWERS   3,493,063
GAS WEIGHING APPARATUS
Filed May 14, 1968   3 Sheets-Sheet 2
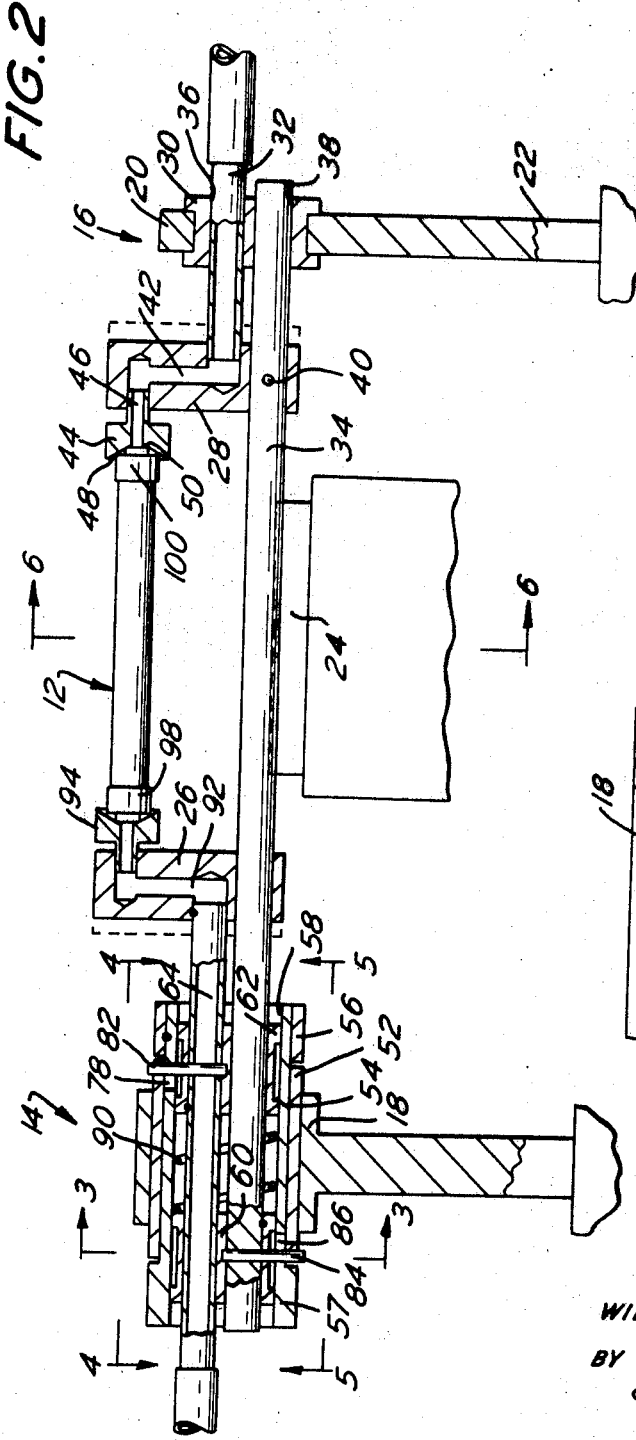
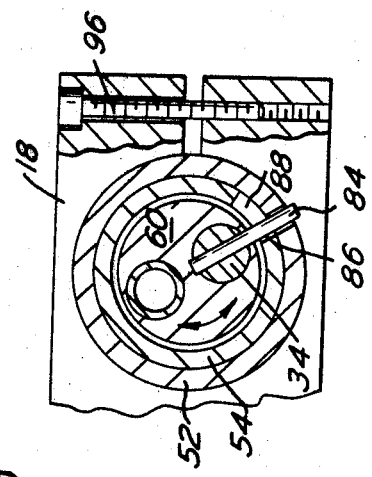
INVENTOR
WILLIAM H. BOWERS
BY
Seidel & Gonda
ATTORNEYS.

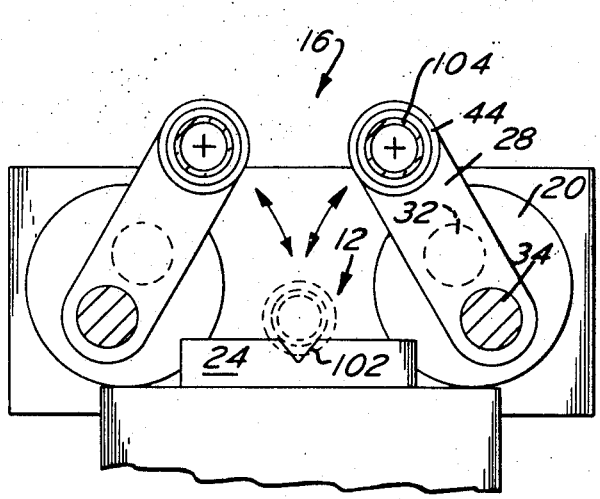
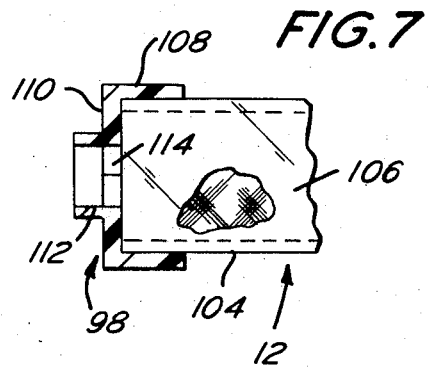
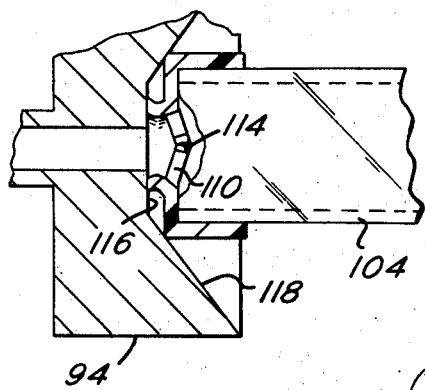
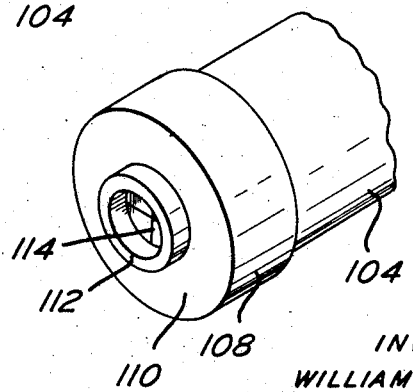

United States Patent Office
3,493,063
Patented Feb. 3, 1970

3,493,063
GAS WEIGHING APPARATUS
William H. Bowers, Buckingham, Pa., assignor to
Arthur H. Thomas Company, Philadelphia, Pa.,
a corporation of Pennsylvania
Filed May 14, 1968, Ser. No. 728,973
Int. Cl. G01g 9/00
U.S. Cl. 177—145                                           11 Claims

ABSTRACT OF THE DISCLOSURE

An apparatus for weighing gases, wherein an enclosure forms a part of a continuous gas carrying conduit, and is provided at its ends with sealing means so that it may be released from the conduit and placed on a scale to measure the weight of the gas it contains.

---

This invention relates to gas weighing apparatus, and more particularly, to apparatus for weighing quantities of gaseous fluids in gastight containers of known weight.

It has been proposed to weigh gases or vapors by passing them through weighed quantities of absorbent material, and then weighing the material to determine by its change in weight the weight of the matter absorbed. Typically, apparatus for the above procedure includes a sample enclosure, which contains the absorbent, and an associated weight measuring device, such as a scale or balance. The gas weighing procedure is performed by first weighing the absorbent bearing enclosure, admitting the gas to the enclosure for absorption, and transferring the enclosure to the weight measuring device for weighing.

Naturally, leakage of gas during the transfer and weighing operations result in errors in the observed weight, and such leakage has been a shortcoming in known apparatus. Such apparatus has typically had cumbersome and unreliable sealing means for the sample enclosure. Another shortcoming typical of the prior art apparatus has been the need for relatively difficult manipulation to achieve transfer of the enclosure to the weight measuring devices.

The present invention overcomes the problems attendant known prior art apparatus by providing a novel sampling enclosure having normally closed ends, openable in response to the application of pressure thereon, and means for supporting the enclosure and applying pressure to its ends when a sample is to be taken. Moreover, the means provided by the present invention for supporting the enclosure are arms, simultaneously movable to provide in effect a conveyance for the enclosure to the weight measuring device. When released for weighing, the enclosure is effectively and automatically sealed, thereby insuring accurate weight measurement. The enclosure of the present invention may form a portion of a continuous gas carrying conduit, and the arms so constructed that after weighing the enclosure is re-opened by pressure from the arms, and lifted by the arms from the weight measuring device.

Thus, it is an object of this invention to provide a novel apparatus for weighing gases or vapors.

It is another object of this invention to provide an apparatus for weighing a gas or vapor wherein an enclosure is automatically sealed when placed on a weight measuring device for weighing, and placed in communication with a source of fluid when lifted from the weight measuring device.

It is still another object of this invention to provide a sample apparatus for weighing a gas or vapor wherein a sample enclosure need not be handled manually at any time during the weighing operation.

It is still further object of this invention to provide an apparatus for weighing a gas or vapor which overcomes the need for complex control movements for accomplishing the weighing operation.

It is a still further object of the invention to provide a simple and reliable pressure operable seal in a gas or vapor sample enclosure.

Other objects will appear hereinafter.

The above and other objects of the invention are accomplished by an apparatus including an enclosure for retaining a sample, supporting means for the enclosure which include means for clamping respective portions of the enclosure, conduit means in the enclosure supporting means for conducting a sample to the enclosure, and sealing means associated with the enclosure responsive to pressure of the clamping means for sealing or opening the enclosure.

For the purpose of illustrating the invention, there is shown in the drawings a form which is presently preferred; it being understood, however, that this invention is not limited to the precise arrangements and instrumentalities shown.

FIGURE 2 is a side elevation view, partially in section, taken along the line 2—2 in FIGURE 1.

FIGURE 3 is a partial cross-sectional view taken along the line 3—3 in FIGURE 2.

FIGURE 6 is a sectional ivew taken along the line 6—6 in FIGURE 2.

FIGURE 7 is a partial sectional view of a portion of the sample enclosure of the present invention, showing details of the end closure in its closed or sealing position.

FIGURE 8 is a view similar to FIGURE 7, showing the end closure in its open position.

FIGURE 9 is a perspective view of the sample enclosure.

Figure 1:
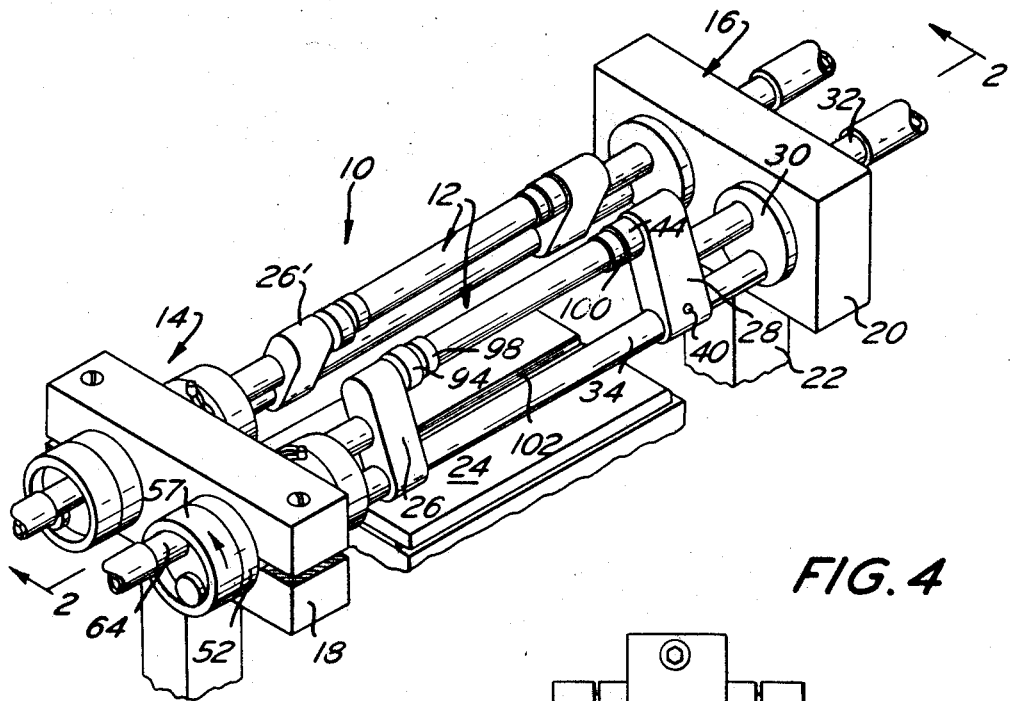
FIGURE 1 is a perspective view showing the apparatus of the present invention.

Referring now to the drawings in detail, wherein like numerals indicate like elements, there is seen in FIGURE 1 a gas weighing apparatus designated generally by the reference numeral 10. The apparatus 10 includes sample vessels or enclosure 12 and enclosure support structures 14 and 16. The support structures 14 and 16 include a pair of spaced fixed support members, 18 and 20, respectively. Each of the fixed support members includes an upright portion of which the upright portion 22 is typical, and each of the upright portions is coupled to a common fixed base member, not seen in FIGURE 1. The apparatus 10 also includes a weight measuring device 24, the purpose of which will be explained later.

Pivotally coupled to the enclosure support structures 14 and 16 are respective enclosure support arms 26 and 28. As seen in FIGURE 1, more than one support arm may be coupled to each of the support structures. For the purpose of this disclosure, only the arms 28 and 26 and the structure related thereto will be described in detail, it being understood that such arms and structure are typical.

A cylindrical support bearing 30, is journaled in the fixed support member 20. A gas conduit 32 and longitudinal support rod 34 are slidably received in spaced bores 36 and 38, respectively, in the support bearing 30. The bores 36 and 38 are best seen in FIGURE 2. Referring now to FIGURE 2, support arm 28 is fixed to the longitudinal support rod 34 adjacent the support bearing 30, as for example, by a locking pin 40 or the like. The support arm 28 includes a flow passage 42 therein, and an end of the gas conduit 32 is secured to the support arm in fluid communication with the passage 42. A clamping member 44 is disposed adjacent an end of the support arm 28 remote from the longitudinal support rod 34 and gas conduit 32. The clamping member 44 includes a central passage 46 in communication with the flow passage 42. Also, for a purpose to be explained later, the clamping member 44 is provided with a conical recess 48 and radially extending seat 50. The central passage 46 communicates with the recess 48 and seat 50.

It should now be apparent that the support arm 28, gas conduit 32, longitudinal support rod 34 and cylindrical support bearing 30 are rotatable as a unit, and that the arm and conduit are movable with respect to the cylindrical support bearing in an axial direction. The limits of such movement are illustrated by the dotted line portions at the right in FIGURE 2.

Referring again to FIGURES 1 and 2, a sleeve 52 is provided in the fixed support member 18 in axial alignment with the above-described cylindrical support bearing 30 in the fixed support member 20. Referring to FIGURE 2, a rotatable inner sleeve member 54 is disposed within the sleeve 52. The inner sleeve member 54 is retained against axial sliding with respect to the sleeve 52, for example, by a collar 56 and enlarged end 57, and includes an internal bore 58. Within the bore 58 are first and second slide bearings 60 and 62. The slide bearing 60 is fixedly secured to one end of the aforementioned longitudinal support rod 34. The slide bearing 62, on the other hand, is provided with a clearance bore, not numbered, through which the support rod 34 passes. A gas conduit 64 passes through and is secured to the slide bearing 62, and is slidably received in a clearance bore, not numbered, in the slide bearing 60.

Figure 4:
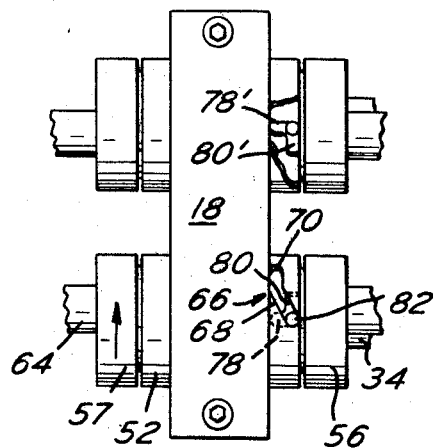
FIGURE 4 is a partial top plan view taken along the line 4—4 in FIGURE 2.
Figure 5:
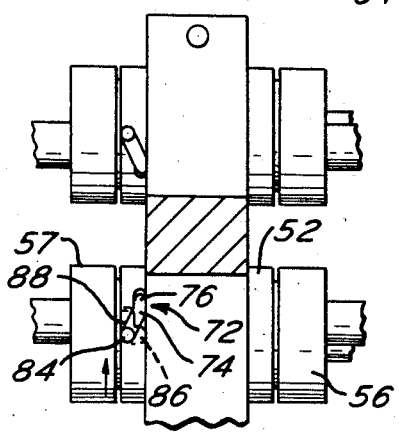
FIGURE 5 is a partial bottom plan view taken along the line 5—5 in FIGURE 2.

Referring now to FIGURES 4 and 5, the sleeve 52 includes a cam slot designated generally by the reference numeral 66. The cam slot 66, which may be referred to as a first cam slot, includes a helical portion 68, advancing axially of the sleeve, and a circumferential portion 70. The sleeve 52 also includes a second cam slot 72, including a helical portion 74 and circumferential portion 76. The inner sleeve member 54 includes an axially extending slot 78, and intersecting therewith, a circumferentially extending portion 80. The slot 78 and circumferentially extending portion 80 are seen in dotted lines at the lower part of FIGURE 4, and a similar arrangement, designated by primed like numerals in the broken away portion at the upper part of the figure. The slot 78', 80', it should be understood, is a mirror image of slot 78, 80, due to opposite rotation of the enclosure support arm 26' associated therewith. See in this regard FIGURE 1.

A cam follower pin 82 extends radially outwardly from the slide bearing 62; through the slot 78 or circumferential portion 80 in the inner sleeve member, as will be explained hereinafter; and into sliding engagement with the cam slot 66. The pin 82 may, if desired, extend through the conduit 64, as illustrated, thus securing the slide bearing 62 to the conduit. Other means can, of course, be used. A radially extending cam follower pin 84 extends outwardly from the slide bearing 60; through a slot 86 or circumferential portion 88 seen in dotted lines in FIGURE 5; and into engagement with the second cam slot 72. The pin 84 may serve to connect the slide bearing 60 to the support rod 34. See FIGURE 3.

A compression spring 90 encircles the gas conduit 64 and rod 34 within the bore 58 of the inner sleeve member 54. Opposite ends of the spring 90 abut the slide bearings 60 and 62 and bias them apart for a purpose to be explained later.

The support arm 26, similar in construction to the above-described support arm 28, is slidably supported on the longitudinal support rod 34, and fixedly secured to an end of the gas conduit 64. The support arm 26 includes a flow passage 92, and has at its end a clamping member 94 similar in all respects to the member 44 associated with the arm 26.

The operation of the enclosure support structure 14 and 16 should now be apparent.

Rotation of the inner sleeve member 54 may be accomplished manually by grasping and twisting the end portion 57. The end portion 57 may be knurled to facilitate such manipulation. Rotation of the inner sleeve member 54 in the direction indicated by the arrows in FIGURES 1, 4 and 5 causes an edge of the slot 78 to contact the cam follower pin 82, thereby causing rotation of the slide bearing 62. Rotation of the slide bearing 62 causes a like rotation of the gas conduit 64 and longitudinal support rod 34, and hence rotation of the support arm 26. Moreover, rotation of the slide bearing causes the cam follower pin 82 to traverse the helical portion 68 of the cam slot 66, thereby moving the slide bearing 62 to the left as seen in FIGURE 2. The slot 78 in the inner sleeve member 54 provides clearance for the pin 82 to permit such movement of the slide bearing 62. Thus, rotation of the inner sleeve member 54 causes simultaneous rotation and retraction of the support arm 26 to the dotted line position in FIGURE 2.

Rotation of the inner sleeve member 54 also rotates the slide bearing 60, and causes the follower pin 84 to traverse the helical portion 74 of the slot 72 in the sleeve 52 and the slot 86 in the inner sleeve member 54. Thus, slide bearing 60 is moved against the bias of the spring 90 axially of the bore 58 in a manner similar to the slide bearing 62, but in an opposite direction. Such movement of course carries to the right with the slide bearing 60 the support rod 34 and the support arm 28. The support rod 34 transmits the rotation of the slide bearing 60 to the cylindrical support bearing 20, and the translation of the support rod 34 results in a like translation to the right of the support arm 28. The gas conduit 32 rotates with the support bearing 20, and such rotation, with that of the support rod 26, imparts to the support arm 28 a rotation identical to that of the arm 26.

Thus it is seen that as the support arms 26 and 28 rotate toward an upper surface of the weight measuring device 24, see in this regard FIGURE 6, they simultaneously move apart. The amount of rotation of the arms 26 and 28 is determined by rotation of the slide bearings 60 and 62 and the cylindrical support bearing 30, the movement of which is limited in turn by the length of the cam slots 70 and 72. A 60 degree arc has been found adequate, although others could be used if desired. As best seen in FIGURES 1 and 3, the fixed support member 18 may be constructed to form in effect a split collar for retaining the sleeve 52. A lock screw 96 may be provided to selectively tighten the collar thus formed, thereby providing a convenient adjustment of initial and final support arm position.

It should also now be apparent that rotation of the sleeve 52 in the direction opposite from that shown by the arrows in FIGURES 1, 4 and 5 causes the circumferential portion 80 associated with the slot 78 to block the cam follower pin 82 from movement along the cam slot 66. Also, the circumferential portion 88 associated with the slot 66 prevents movement of the cam follower pin 84 along the slot 72. Thus, the respective circumferential portions 80 and 88 provide in effect a lock holding the support arms 26 and 28 in an upper position.

The manner in which the above-described enclosure support structure 14 and 16 convey and support the sample enclosures 12 is now made apparent. Thus, when the enclosure support arms 26 and 28 are in the position shown in FIGURE 1 and in full line in FIGURE 2, they are at their closest convergence, and the clamping members 44 and 90 engage yieldable end closure portions 98, 100, to be fully described later, of the enclosure 12. When rotated as indicated by the arrows in FIGURE 6, the support arms 26 and 28 gradually diverge so that when the enclosure 12 rests on the weight measuring device 24, the enclosure is no longer supported by the arms. Hence, the enclosure is weighed without interference from the arms 26 and 28. As is apparent in FIGURES 1 and 6, a notch 102 may be provided in the upper surface of the weight measuring device 24 to receive and retain the enclosure 12. When released by the support arms 26 and 28, the ends of the closure are sealed by the end portions 98, 100, which form an important part of the present invention, and will now be described in detail.

Referring now to FIGURES 7 to 9, there is seen the novel end closure structure for the enclosure 12. The enclosure 12, it will be seen includes a cylindrical body portion 104. Within the body portion 104 there is a quantity of gas absorbent material 106 for retaining a sample to be weighed. It will be appreciated that adsorbers as well as absorbers could be used, and hence, the material 106 may be described generally as gas retaining material. The end closure portions 98 and 100, of which 98 is exemplary, may be constructed of a variety of natural and synthetic elastomeric materials. The closure portion 98 includes an axially extending annular flange portion 108 and a radial end wall 110. The flange 108 and end wall 110 define a recess adapted to receive an end of the tubular body portion 104. Extending outwardly from the radial end wall 110 in a direction opposite from the flange portion 108 is an annular projection 112. Within the projection 112 are crossed slits 114. The resilience of the material, it will be understood, normally maintains the slits 114 in closely abutting relation, thereby providing a gas seal between the interior of the body portion 104 and the atmosphere. Referring to FIGURE 8, the closure portion 98 is seen in its open or "gas admitting" position. Thus, the annular projection 112 rests on a seat 116 of the previously mentioned clamping member 94. Pressure applied by the seat to the annular projection 112 causes deformation of the radial end wall 110 and consequently, spreading of the abutting edges of the slits 114. It will be understood that the end closure condition illustrated in FIGURE 8 corresponds approximately to the condition of the support arms 26 and 28 in FIGURES 1 and 2. It will also be understood that as the arms 26 and 28 diverge during rotation and deformation of the end closure portion 98 diminishes until sealing occurs. The self-sealing action of the closure portion 98 is due to the fact that openings of the slits 114 as in FIGURE 8 results from compressive deformation of the annular projection 112, and elimination of such deformation returns the entire radial end wall 110 to its original configuration. Thus, when the clamping members 44 and 94 no longer apply sufficient pressure to the annular projection 112, the enclosures 12 are effectively sealed. Such sealing ordinarily occurs just before the enclosure 12 comes to rest on the weight measuring device 24. It should be understood that rotation of the arms 26 and 28 is ordinarily continued somewhat beyond this point, causing the cam follower pins 82 and 84 to enter the respective circumferential portions 70 and 76 of the cam slots 66 and 72, thereby providing a detent to retain the arms in their retracted positions wherein the clamping members 44 and 94 are out of contact with the end closure portions 98 and 100.

It should be apparent, therefore, that weighing of the enclosure 12 can be performed without interference from the enclosure support structure 14 and 16, and moreover, that the enclosure can be once again picked up and placed in communication with the gas conduits 32 and 64 by simply reversing the rotation applied to the enlarged end 57 of the inner sleeve member 54. Thus, rapid and accurate weight measurements may be taken with the present apparatus with a minimum of manipulations, and minimal errors due to leakage of the sample. The conical recess 48 of the clamping member 44 and the corresponding recess 118 of the member 94 insure proper centering of the enclosure 12 during pick-up.

The closure support structure may of course be placed in a protective enclosure to further guard against random weighing error, induced for example by temperature changes. Also, although the enclosure 12 here illustrated has a simple tubular configuration, other forms may be used if desired, the only limitation being that it have opposed closures for contact by the clamping members 44 and 94 and dimensions which permit its placement on the weight measuring device. The weight measuring device, it should be understood, may be any sufficiently sensitive device, and may take the form of a pan balance, electronic balance, beam balance, etc.

The present invention may be embodied in other specific forms without departing from the spirit or essential attributes thereof.

I claim:

1. In an apparatus for weighing gases, an enclosure for retaining a gas sample, supporting means for said enclosure, said supporting means including means for clamping respective portions of said enclosure, conduit means in said supporting means for conducting fluid to and from said enclosure, and sealing means coupled to said enclosure at said respective portions for placing the interior of said enclosure in fluid communication with said conduit means in response to clamping of said sealing means by said clamping means.

2. In apparatus in accordance with claim 1, said respective portions of said enclosure being opposite end portions.

3. In an apparatus in accordance with claim 2, said enclosure being a hollow tubular member and said sealing means comprising closure members having normally closed self-sealing openings therein, and means for opening said normally closed openings responsive to pressure applied by said clamping means.

4. In an apparatus in accordance with claim 2, said enclosure being a hollow tubular member and said sealing means comprising resilient closure members having normally closed self-sealing openings therein, and said closure members including longitudinally extending portions adjacent said openings adapted to be contacted by said clamping means so that force on said longitudinally extending members causes deformation of said closure members and opening of said self-sealing openings.

5. In an apparatus in accordance with claim 3, said supporting means including spaced pivotable arms for supporting opposite ends of said enclosure, said clamping means being disposed adjacent ends of said arms distal from their axes of rotation, and means for moving said arms toward and away from each other to engage said sealing means.

6. In an apparatus in accordance with claim 5, means for rotating said arms from a first position wherein said clamping means contact and apply pressure to said longitudinally extending portions to open said self-sealing openings to a second position wherein said clamping means are out of contact with said closure members, said means for moving said arms toward and away from each other being coupled to said means for rotating said arms, and a weight sensing means disposed adjacent said second portion for receiving said enclosure and sensing the weight thereof.

7. In an apparatus in accordance with claim 6, said arms having a third position intermediate said first and second positions wherein said clamping means contact said closure members and said normally closed self-sealing openings are closed.

8. In an aupparatus for weighing gases in an enclosure, supporting and transporting means for the enclosure comprising a pair of spaced pivotable arms for the enclosure comprising a pair of spaced pivotable arms for supporting opposite ends of said enclosure, clamping means on said arms distal from their axes of rotation for contacting said enclosure, means for moving said arms toward and away from each other to contact the enclosure, and means for rotating said arms from a first position wherein said clamping means are adapted to contact the enclosure to a second position wherein said clamping means are out of contact with the enclosure, said means for moving said arms toward and away from each other being coupled to and said means for rotating said arms so that rotation of said arms causes them to move toward and away from each other.

9. In an apparatus in accordance with claim 8, gas passages in said arms for conducting gas to the enclosure through said clamping means.

10. In an apparatus for weighing gases, an enclosure for retaining a gas sample comprising a tubular body portion, a pair of resiliently end closure members disposed at opposite ends of said body portion, and a gas retaining material in said body portion for retaining a quantity of gas to be weighed said end closure member having normally closed openings therethrough, and means on said closure members adjacent said normally closed openings for opening said normally closed openings in response to force thereon.

11. In an apparatus in accordance with claim 10, said normally closed openings comprising slits in said closure members, and said last-mentioned means comprising an annular projection disposed around said slits.

References Cited
UNITED STATES PATENTS

| | | | |
|---|---|---|---|
| 676,858 | 6/1901 | Arndt | 73—30 |
| 1,905,558 | 4/1933 | Foote | 177—16 X |
| 2,998,722 | 9/1961 | Jaquith | 177—16 X |
| 3,002,387 | 10/1961 | Micheletti. | |

ROBERT S. WARD, Jr., Primary Examiner

GEORGE H. MILLER, Jr., Assistant Examiner

U.S. Cl. X.R.

73—30, 421.5